June 12, 1928.  1,673,007
C. S. KAISER
LIQUID DISPENSING DEVICE
Filed Oct. 3, 1925
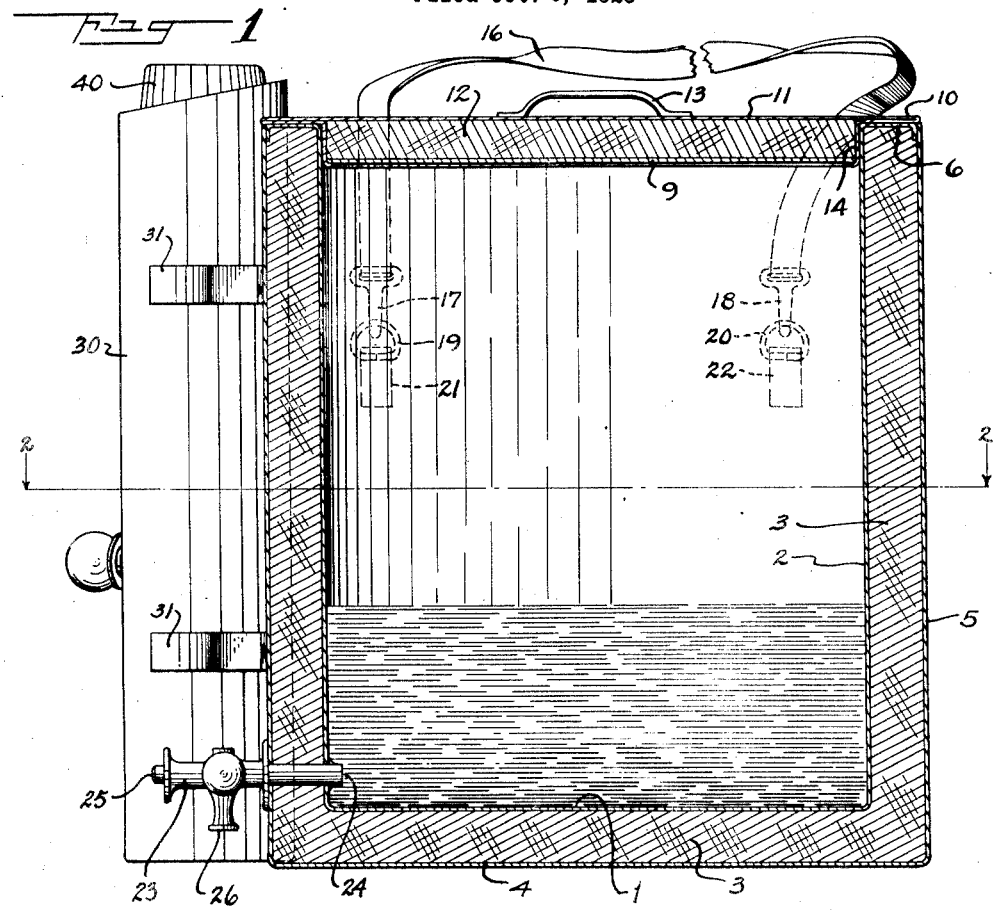
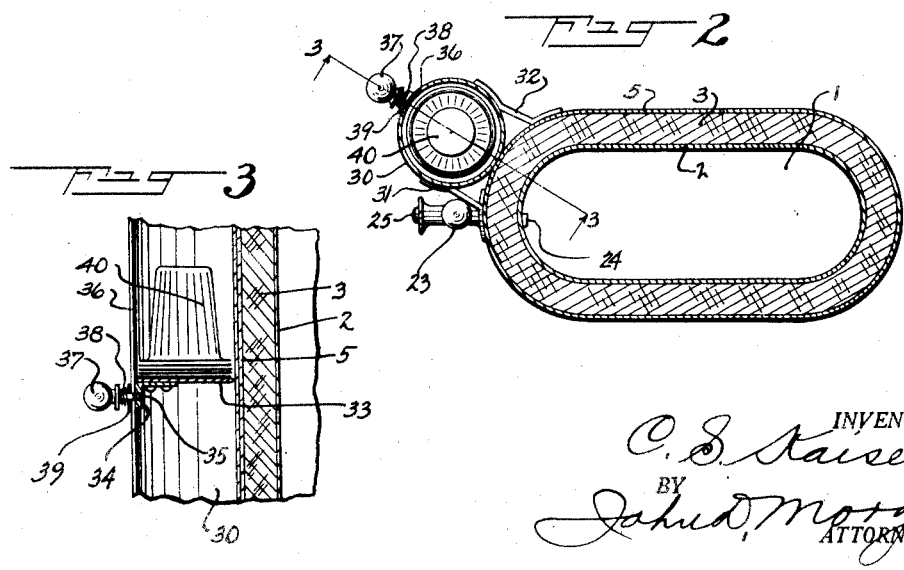
INVENTOR.
C. S. Kaiser
BY
John D. Morgan
ATTORNEY Patented June 12, 1928.

1,673,007

UNITED STATES PATENT OFFICE.

CHARLES S. KAISER, OF SUMMIT, NEW JERSEY.

LIQUID-DISPENSING DEVICE.

Application filed October 3, 1925. Serial No. 60,176.

The invention relates to improvements in liquid-dispensing devices, and more especially to portable devices for dispensing drinks from a container, which container is supported from the person of the vendor leaving the hands of the latter free.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central, longitudinal section through a dispensing device embodying my invention;

Fig. 2 is a full horizontal section, greatly reduced in size, on the line 2—2 of Fig. 1; and Fig. 3 is a fragmentary vertical section on the line 3—3 of Fig. 2.

The invention is directed primarily to providing a dispensing device, preferably supported on the shoulder, and located beneath the arm of the vendor; the device having a liquid reservoir of heat-insulated hot or cold beverage, with means for tapping the same, and a sanitary cup reservoir with means for supplying the cups, one at a time at a convenient point for handling by the vendor, to be filled with the liquid and handed to the customer.

In the present preferred embodiment of the invention, a reservoir is provided of somewhat flat and oblong or oval shape, adapted to rest relatively closely against the side of the vendor, when suspended from his shoulder, and liquid-dispensing and cup-supplying means attached to the reservoir, and located so as to be convenient for manipulation by both hands of the vendor in taking the cups, dispensing the liquid, and handing the full cups to customers.

The reservoir is preferably provided with a flat bottom 1, and an oblong or oval, endless vertical side wall 2, and these parts are surrounded by a heat insulating layer 3 of any suitable material. The heat insulating layer is carried within the corresponding outer flat bottom 4 and an outer oblong or oval endless wall 5, the inner wall 3, at its top edge being bent outwardly over the heat insulating material, as shown at 6, and connected at its flanged edge to the top edge of the outer wall 5 of the reservoir.

A suitable heat insulated lid is provided, having a flat inner plate 9, a side wall 14, adapted to fit snugly within the interior of the reservoir. The lid has at its top edge a flat, outwardly-extending flange 10, and a flat top plate 11. The space between the plates 9 and 11 is also filled with a heat-insulating material 12. A handle 13 is fixed to the top plate 11, whereby the lid may be taken off to fill the reservoir and thereafter replaced.

The preferred form of supporting means comprises a shoulder strap 16, having hooks 17 and 18 at either end, hooking into corresponding rings 19 and 20, the respective rings being fastened to the flat side of the reservoir by plates 21 and 22, respectively.

The liquid tapping means is shown as a spring faucet 23, let into the lower part of the curved end of the reservoir, and opening at 24 into the lower part of the liquid contained therein. It is provided with a spring valve and plunger 25, and a liquid discharging opening 26. This is in a most convenient location to be actuated by the hand of the operator nearest the reservoir.

The cup-dispensing means, as preferably embodied, is located and supported at the curved end of the reservoir, closely adjacent to the liquid-dispensing means, and the cups are preferably discharged from the magazine at the top end thereof. The magazine comprises a vertically-disposed cylinder 30, attached to the outer wall of the receptacle by pairs of arms 31 and 32.

Slidably positioned within the magazine is a cup-supporting plate 33, to the bottom of which is fixed a bracket 34, which has frictionally-operating positioning means extending outside the magazine wall whereby the vendor may issue one cup at a time from the top of the magazine. In the embodied form thereof, a pin 35 is fixed to the bracket 34, and extends out through a longitudinally-disposed slot 36, in the front of the magazine. A knob 37 is fixed to the pin 34, and a coil spring 38, between the knob and a washer 39 against the magazine wall, presses the cup support and the connected parts against the side wall of the magazine to hold same in position.

The cups 40 rest upon the plate 33 in nested and inverted position. The vendor presses on the knob 37 with his nearest hand, thereby releasing the friction and moves the knob upwardly so that the topmost cup projects from the upper end of the magazine as shown in Fig. 1. He then grasps the cup with his other hand, places it beneath the spigot 36, and with said nearest hand presses the spring plunger 25, thereby filling the cup, and then hands it to the customer.

The invention in its broader aspects is not limited to the specific mechanisms shown and described, but departures may be made therefrom within the scope of the accompanying claims without departing from the principles of the invention and without sacrificing its chief advantages.

What I claim is:—

1. A liquid vending device including in combination a relatively flat liquid reservoir, means for suspending it from the person of the vendor beneath his arm, liquid tapping means at the bottom and front end of the reservoir when so suspended, a sanitary cup magazine attached to the front end of the reservoir adjacent the liquid tapping means, and means for dispensing the cups from the top of the magazine at the top of said reservoir.

2. A liquid vending device including, in combination, a relatively flat liquid reservoir, means for suspending it from the shoulder of a vendor beneath his arm, liquid tapping means at the lower part of the reservoir when so suspended, and an elongated cup magazine attached to the reservoir and having a dispensing opening for the cups.

3. A liquid vending device including in combination a relatively flat liquid reservoir having heat insulating means for maintaining substantially constant the temperature of the interior of the reservoir, means for suspending the reservoir from the person of the vendor beneath his arm, liquid tapping means at the bottom and front end of the reservoir when so suspended, and a sanitary cup magazine, attached to the reservoir, and having a dispensing opening for the cups.

In testimony whereof, I have signed my name to this specification.

CHARLES S. KAISER.